UNITED STATES PATENT OFFICE.

JOHN P. DYER, OF PUEBLO, COLORADO TERRITORY.

IMPROVEMENT IN MEDICAL COMPOUNDS OR SALVES.

Specification forming part of Letters Patent No. 152,833, dated July 7, 1874; application filed May 22, 1874.

*To all whom it may concern:*

Be it known that I, JOHN P. DYER, of Pueblo, Colorado Territory, have invented a certain Compound of Medicines, to be used in the case of cancerous affections, ulcers, and malignant sores, of which the following is a specification:

This invention relates to those remedies used in the cure of the above-named diseases.

To prepare this remedy, take twenty-five pounds of red-oak bark ground in an ordinary bark-mill; take eight pounds of sarsaparilla. Then put the bark and sarsaparilla in nine gallons of water; boil down to one gallon; then remove the bark and strain the decoction through a coarse cloth; then take the decoction thus obtained and put it in a brass kettle; add to it two ounces of belladonna and two ounces of hyoscyamus, (solid extracts of each;) then add one pint of strained honey, two ounces of gum-turpentine, three ounces of mutton or beef suet, and two ounces of bees-wax; then simmer all these ingredients in the brass kettle over a slow fire until it becomes of the consistency of very thick tar; then add two ounces of gum-camphor, (powdered,) stirring until it is well mixed.

This remedy is used in the following manner: Cleanse the affected part thoroughly with warm water and castile-soap; spread the remedy on a linen cloth, and apply it to the affected part. Let it remain twenty-four hours; then put on a fresh application, cleansing again with castile-soap, and so continue the use of the remedy until a cure is effected. This remedy will in all cases be found to be very soothing to the patient, and will effectually eradicate the entire disease and effect a permanent cure.

What I claim as my invention is—

The compound herein described, composed of red-oak bark, sarsaparilla, belladonna, hyoscyamus, honey, spirits turpentine, camphor, bees-wax, and mutton or beef suet, in about the proportions specified.

J. P. DYER.

Witnesses:
 R. H. WARD,
 CHS. H. LYNCH.